United States Patent [19]
Fritz

[11] Patent Number: 5,200,946
[45] Date of Patent: Apr. 6, 1993

[54] SIMPLE MAGNETO-OPTIC REWRITABLE HEAD FOR ROUGHEDIZED ENVIRONMENTS

[75] Inventor: Bernard S. Fritz, Egan, Minn.

[73] Assignee: Honeywell Inc., Minneapolis, Minn.

[21] Appl. No.: 771,042

[22] Filed: Oct. 2, 1991

[51] Int. Cl.$^5$ ............................................. G11B 7/135
[52] U.S. Cl. .................................... 369/112; 369/116; 369/44.12
[58] Field of Search .................. 369/112, 44.11, 44.12, 369/44.14, 44.24, 44.32, 44.37, 44.41, 44.42, 109, 110, 105, 116; 359/834, 831; 360/114

[56] References Cited

U.S. PATENT DOCUMENTS

| | | | |
|---|---|---|---|
| 4,569,035 | 2/1986 | Tomita | 365/122 |
| 4,626,679 | 12/1986 | Kuwayama et al. | 369/227 |
| 4,639,816 | 1/1987 | Tomita | 360/131 |
| 4,654,839 | 3/1987 | Endo | 369/46 |
| 4,771,411 | 9/1988 | Greve | 369/45 |
| 4,799,210 | 1/1989 | Wilson et al. | 369/110 |
| 4,866,694 | 9/1989 | Korth | 369/112 |
| 4,907,858 | 3/1990 | Hara et al. | 350/286 |
| 4,924,079 | 5/1990 | Opheij et al. | 250/201.5 |
| 4,989,189 | 1/1991 | Sander et al. | 360/114 |
| 5,031,165 | 7/1991 | Fujita | 369/44.11 |
| 5,067,117 | 11/1991 | Shimizu et al. | 369/116 |
| 5,070,493 | 12/1991 | Marshall et al. | 369/44.24 |

OTHER PUBLICATIONS

*Optical Data Storage '91*, section entitled "Compact Magneto-Optical Disk Head Integrated with Chip Elements", pp. 263-268 from Optical Society of America, Feb. 25-27, 1991.

Primary Examiner—Andrew L. Sniezek
Assistant Examiner—Muhammad Edon
Attorney, Agent, or Firm—Charles J. Ungemach

[57] ABSTRACT

An optical recording head for use with a magneto optical recording device wherein a rhomboid prism is utilized having a single PBS coating thereon and being totally internally reflective so that light from a source will pass through the PBS coating once, be totally internally reflected, pass through the PBS coating a second time to form first and second beams, the first passing to the recording apparatus and the second being reflected to pass to a detector to monitor the intensity of the radiation. Light from the recording apparatus containing information is reflected back through the PBS coating to form third and fourth beams, the third being reflected to suitable detecting means and the fourth being passed through the rhomboid prism where it is internally totally reflected and emerges to a detector which is used for monitoring the focal position of the objective lens.

15 Claims, 3 Drawing Sheets

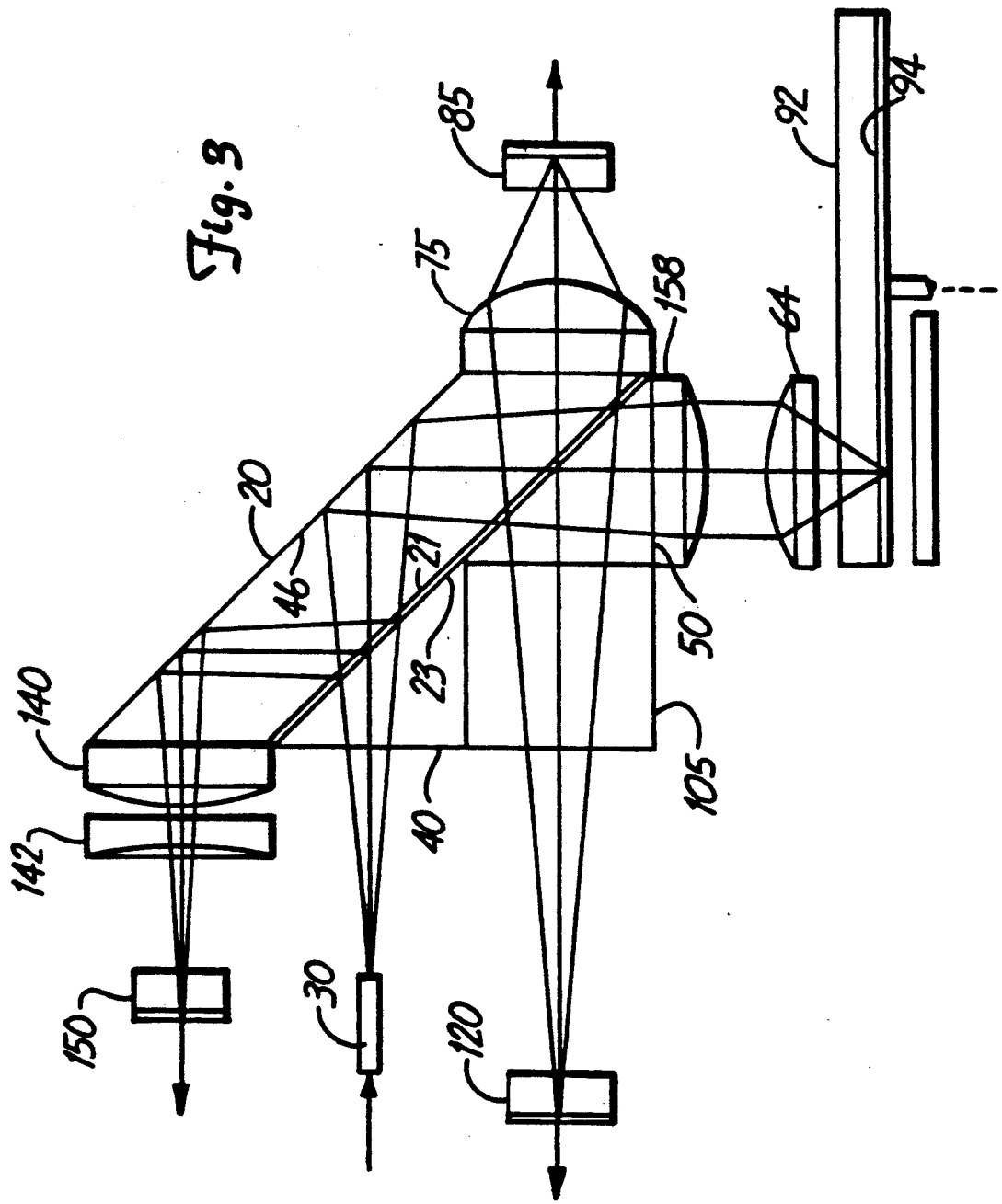

SIMPLE MAGNETO-OPTIC REWRITABLE HEAD FOR ROUGHEDIZED ENVIRONMENTS

BACKGROUND OF THE INVENTION

The present invention relates to an optical head which is simple in construction, minimizes optical components, employs only one beam splitting surface and is useable with a magneto-optic recorder in a ruggedized environment with the capability of monitoring power level presented to the recording medium and monitoring focussing separately from the digital data output.

Optical recording heads are well known in the art as are magneto-optic recorders. In such systems, light, from a source such as a laser diode, is often directed through a beam splitter to a recorder which may take the form of a magneto-optical recorder comprising a substrate with a magnetic film formed thereon. The light from the laser source is polarized and when focused on the magnetic film in the vicinity of a switchable magnetic field it produces a heating effect which causes the film to assume a direction of magnetization in a first or second sense depending on the magnetic field. Subsequent reflection of polarized light from this surface rotates the polarization slightly in a first or second sense. The reflected light is directed therefrom to a suitable detector which can determine the polarization sense and use this information for providing a digital data output. Descriptions of such basic systems may be found in a book entitled "Optical Recording A Technical Overview" by Allen Merchant and published by Addison-Wesley Publishing Company. Section 4.1 (pp. 68-74) describes magneto-optical systems and Section 8.4 (pp. 209-219) describes concepts for magneto-optic heads. Another example may be found in the Tomita U.S. Pat. Nos. 4,639,816 issued Jan. 27, 1987 and 4,569,035 issued Feb. 4, 1986. In these basic systems, although some monitor power level and focus, no provision are made for monitoring the focus of the objective lens so as to maintain the proper focus of the system on the magnetic film separately from the digital data output and no provisions are made for monitoring the power level of the input light so as to maintain this level relatively constant at the magnetic film during operation. A system which monitors the power and controls the output of the laser input in accordance therewith, and which monitors the focus condition of the objective lens may be seen in the Wilson et. al U.S. Pat. No. 4,799,210 issued Jan. 17, 1989. This system, however, does not use polarization rotation for it data recording. Furthermore, it monitors the power level before the beam is split so that the power level is not truly representative of the power reading at the recording medium. Also it does not separately monitor the focus of the objective lens with the result that "cross talk" is introduced in the output signals. Furthermore, the system requires there be at least two beam splitting surfaces for the light paths involved and because considerable difficulty and cost is associated with creating a proper polarized beam splitting (PBS) surface such systems are overly costly. It should also be noticed that the number of optical parts involved in the prior art systems are relatively high and it is desirable to reduce the number of optical parts to a minimum as is explained in an article by Y. Yamanaka et al. entitled "Compact Magneto-Optical Disk Head Integrated With Chip Elements" from the SPIE Vol. 1499 entitled "Optical Data Storage '91" by James J. Burk et al. sponsored by the Optical Society of America.

SUMMARY OF THE INVENTION

The present invention provides a simple and compact design for an optical head in which the number of surfaces that need be coated with beam splitting material is minimized as is the number of optical parts involved. The design is such that it is small in size and is capable of use in ruggedized environments such as in aircraft and spacecraft. Also the power to the magnetic film is monitored and the channels for monitoring the focus and output data are different.

The present invention utilities a single rhomboid prism having but one surface that is coated with an optical beam splitting material. The input light travels through this surface to a second surface of the rhomboid prism that is totally internally reflecting and from there back through the beam splitting surface where two beams are created a first of which contains a majority of the energy and is directed to the magnetic recording material while the remaining minority of the energy is directed to an optical power monitor. Radiation reflected from the surface of the magneto-optic recorder again passes through the single beam splitting surface and again the minority of this energy is reflected to a suitable detector while the remaining majority of the energy passes back into the rhomboid prism, is internally totally reflected and finally emerges from the prism to a detector which is used for monitoring and maintaining the proper focus position of the objective lens.

BRIEF DESCRIPTION OF THE DRAWINGS

FIG. 3 is a schematic diagram of another embodiment of the present invention in which non-collimated radiation is employed.

DETAILED DESCRIPTION OF THE PREFERRED EMBODIMENTS

In describing the present it should be born in mind that the design is intended for use in an environment which requires ruggedization since it is likely to encounter severe stress in connection with vibration and gravitational forces. It should also be born in mind that the system is created with a view towards simplicity and small size as well as low cost in order to maximize its benefits in such an environment. In such a design, a monolithic optical head is used so as to minimize thermal and vibrational sensitivities of the optical components and due to inherently weak data signal of the magneto-optic media, careful consideration is given to maintaining the data signal level as high as possible in spite of the environmental variation. Pursuing the minimization of the optical components further reduces source errors that would affect the data signal level and having a single PBS coating reduces the sensitivity to temperature and humidity variations. Of course, the PBS coating is tailored to reflect as much as possible (nearly 100%) of the S polarization component of the incident light and to pass a high percentage (about 80%) of the P polarization component. The design form makes use of total internal reflection to reduce transmission losses at the various signal path folds and the three functions of power monitoring, data signal detection and focus monitoring are included in the system. It will be noted in connection with the description that transmission from the source to the recording material requires passing the beam through the PBS coating twice which improves the degree of linear polarization by reducing the elliptical polarization affects which the polarization preserving coupling fiber might impart on the beam.

Figure 1:
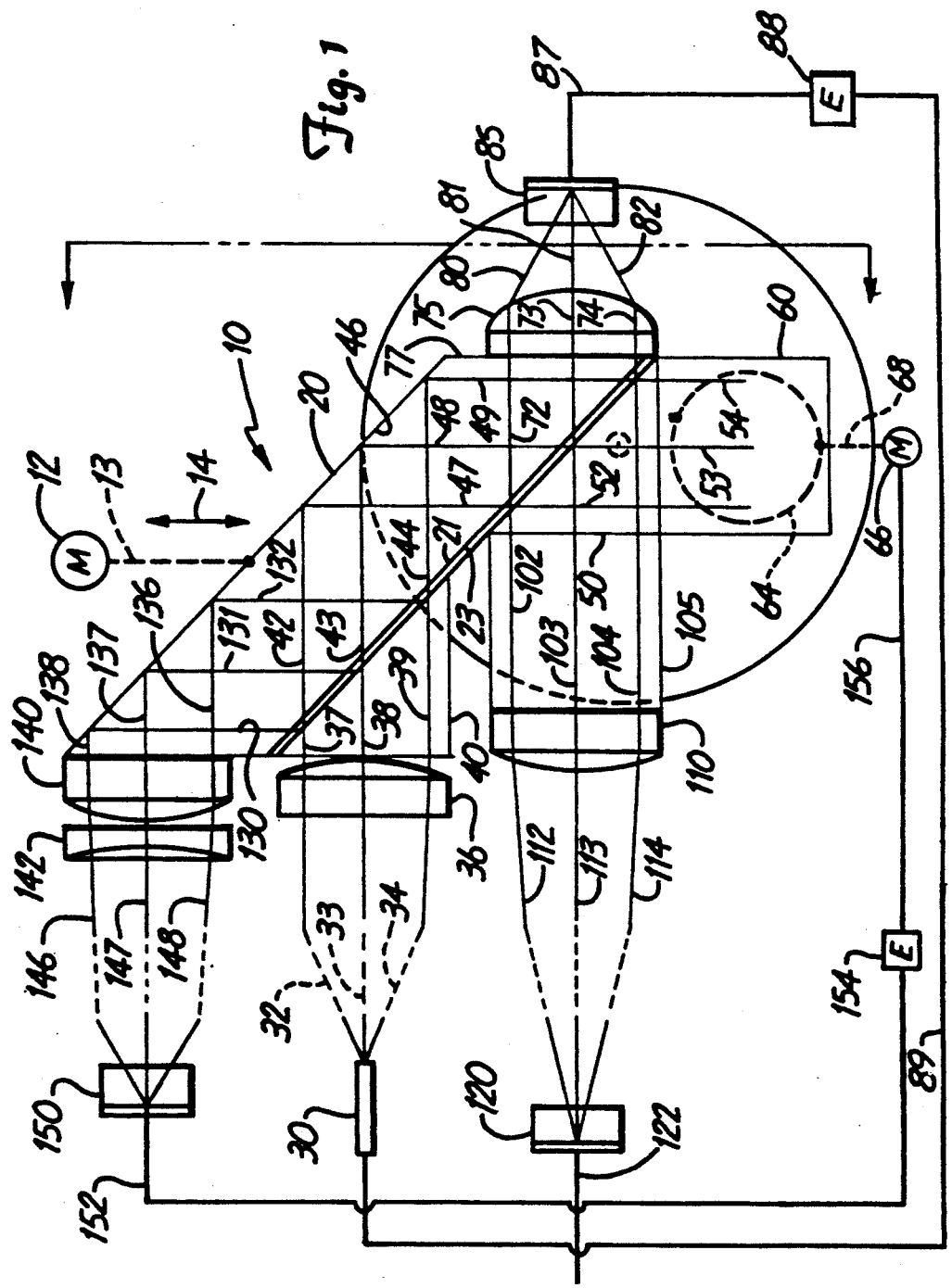
FIG. 1 is a schematic view showing the optical paths of radiation to the various components of the present invention.

With this in mind, attention is directed to FIG. 1 wherein an optical system 10 is shown mounted so that it may be moved by a motive means 12 operating through a mechanical connection shown as dashed line 13 so as to import up and down motion as shown by double headed arrow 14.

A rhomboid prism 20 is shown in FIG. 1 with a lower or first surface 21 upon which a PBS coating 23 has been deposited. As mentioned the PBS coating is tailored to reflect as much possible "S" polarization component as possible and to pass a high percentage of the "P" polarization component.

Radiation or light from a suitable source 30, which may be a laser diode or a laser diode with a fiber optic coupling attached thereto, is shown transmitting polarized radiation along lines such as 32, 33 and 34 to a collimating lens 36 which directs collimated beams of radiation shown by lines such as 37, 38 and 39 through a right angled prism 40 which has its hypotenuse cemented to an upper portion of the surface 21 so that the radiation strikes the PBS coating and is split into 2 beams, one of which containing nearly all of the "S" polarization component is reflected downwardly and out of the system while a majority (about 80%) of the "P" component passes to the interior of the rhomboid prism 20 along lines such as 42, 43 and 44. This radiation after passing though the rhomboid prism 20 strikes an upper or second surface 46 of rhomboid prism 20 at such an angle that it is substantially totally reflected downwardly in FIG. 1 along lines such as 47, 48 and 49.

This radiation containing a high "P" polarization component passes through the lower portion of the PBS coating 23 where, again, substantially all of any "S" polarization component that may be left and a low percentage (about 20%) of the remaining "P" polarization component is reflected and a high percentage (about 80%) of the remaining "P" polarization component passes through the PBS coating 23 onto a second right angled prism 50 which has its hypotenuse cemented to a lower portion of the surface 21 of rhomboid prism 20. This energy passing along lines such as 52, 53 and 54 passes through prism 50 to a mirror 60 cemented to the bottom of the optical system 10 along one edge of the right angle prism 50. Mirror 60 and it's relationship to the rhomboid prism 20 is better seen in FIG. 2.

Figure 2:
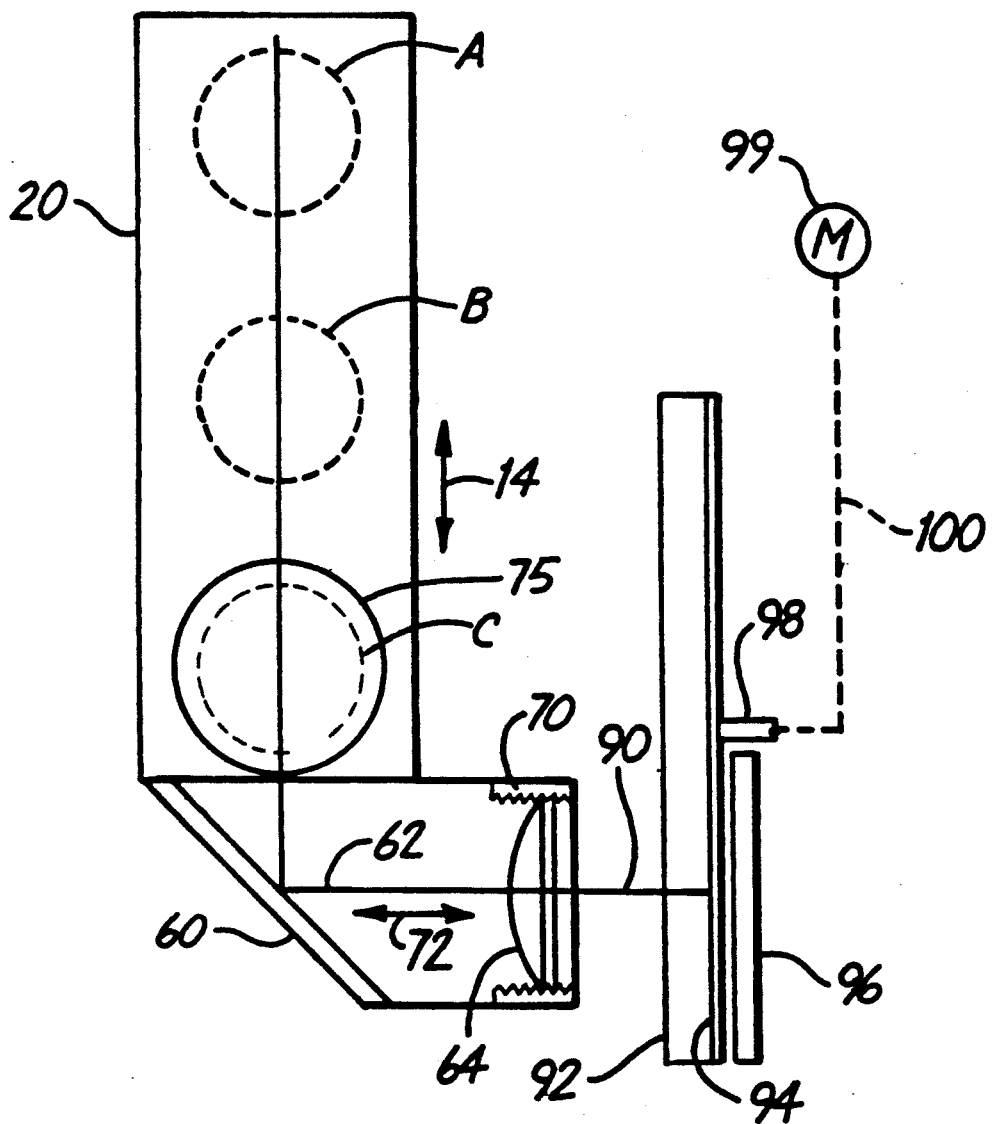
FIG. 2 is a side view of FIG. 1 taken along lines 2—2.

After reflection from mirror 60 the radiation passes along lines such as 62 through an objective lens 64 which is shown to be movable by motive means 66 operating through a connection shown as dash line 68 (FIG. 1) to move the lens back and forth, for example by rotating it in a threaded arrangement 70 so as to produce the motion along lines such as the double headed arrow 72 in FIG. 2. As will be explained this will allow the lens to be properly focused on the recording medium at all times. The portion of the energy which was reflected in the lower part of the PBS coating of FIG. 1 is directed along lines such as 72, 73 and 74 through a lens 75 which is cemented to one of the end surfaces 77 of rhomboid prism 20. Lens 75 has a relatively short focal length so that the energy passing therethrough along .lines such as 80, 81 and 82 is focused on a detector 85 so as to produce an output along a line 87 to suitable electronic system shown as box 88 which produces an output along line 89 which adjusts the level of radiation produced by source 30 in order to maintain the amount received by the recording medium relatively constant as is desired.

As best seen in FIG. 2, the radiation passing through the objective lens 64 as shown by a line 90 and is focused through a substrate 92 onto a layer of magnetic recording material 94 which is proximate to a permanent magnet or an electromagnet 96. As is known in magnetic optical recording,-this produces a thermal effect and rotates the polarization of a beam reflected from the material in a first or opposite direction in accordance with the orientation of the magnetic field produced by the magnetic 96. As mentioned, magnet 96 may be either a permanent magnet which can be switched so as to have its direction of magnetization changed or can be an electromagnetic which changes direction of polarization with the direction of current therethrough. As shown in FIG. 2, magnet 96 lies radially along surface of the magnetic material 94 but, if desired, a small magnetic may be utilized which would then have to be moved with lens 64 so as to be, at all times, directly beneath the beam 90 where it is focused on the material 94.

The magnetic material 94 and the substrate 92 are mounted for rotation about an axis defined by a shaft 98 which may be controlled by a motive means 99 operating through a connection shown as dashed line 100. In order to place information upon the magnetic recording apparatus, the substrate 92 and its coating of magnetic material 94 are rotated by the motive means 99 to various angular positions and, as explained above, the optical apparatus 10 is movable up and down in FIG. 2 along the direction shown by double headed arrow 14. Fine tracking may be performed by sample servo technique (not shown) such as described in the above-mentioned book "Optical Recording A Technical Overview" on pages 180 and 181 so as to produce a plurality of discrete positions along the magnetic recording material 94 where information can be deposited.

In order to read the information which has already been placed on the magnetic material 94, the same apparatus as above described is employed and the radiation which strikes the magnetic material 94 has its polarization direction rotated and is reflected back through the substrate 92 and along the paths such as shown by line 90 to the objective lens 64 where it is again collimated and directed back towards mirror 60 along lines such as shown by reference numeral 62. Mirror 60 reflects the return radiation upwardly through the right angled prism 50 along the lines such as shown by reference numerals 52, 53 and 54 in FIG. 1 where such reflected radiation again strikes the PBS coating in the lower portion of the surface 21 of rhomboid prism 20. Again a relatively small portion (20%) of the such radiation is reflected along paths such as shown by reference numerals 102, 103 and 104 in FIG. 1. This radiation passes out of the right angle prism 50 into a rectangular Wollaston prism 105 which divides the radiation into two portions in well-known manner. The Wollaston Prism, preferably quartz to lower cost, is oriented such that if no data signal is present on the magneto optic media, an equal amount of energy is in each of the two portions. If the data on the magnetic recording device causes rotation of the polarization in a first direction, then the amount of energy in a first of the two portions will be greater than the second. If the rotation is in the opposite direction, then the second portion will contain more energy than the first.

In any event the two portions of energy from the Wollaston Prism pass through a lens 110 and are directed along lines such as shown by reference numerals 112, 113 and 114 to be focused on a detector 120 which operates to determine which, if either, of the two portions of energy is greater than the other. This determination produces an electrical signal upon a line such as shown by reference numeral 122 which then passes to a suitable utilization device such as a computer (not shown).

In order to maintain the lens 64 in the proper focus position, the majority of the energy reflected from the magnetic recording material 94 in FIG. 2 and reflected off of mirror 60 in FIG. 1 passes through the PBS coating 23 and back into the rhomboid prism along lines such as 47, 48 and 49. Here again, there is total internal reflection off the upper surface 46 of rhomboid prism 20 and the energy is reflected to the left along lines such as 42, 43, and 44 to the upper portion of the PBS coating 23. A major portion of this energy passes again through the PBS coating and is lost into the right angle prism 40 but the minority of the energy is reflected from the upper portion of the PBS coating 23 and passes upwardly along lines such as 130, 131 and 132 where it is again totally internally reflected from the upper surface 46 of rhomboid prism 20 to the left along lines such as 136, 137 and 138. This energy is passed through a focusing lens 140 and a cylindrical lens 142 along lines such as 146, 147 and 148 to be focused as a line of light on a detector 150. Detector 150 operates to determine whether the focus position is proper and produces an output along a line 152 which is presented to the suitable electronics 154 which has an output along a line 156 operable to control motor 66 to position lens 64 in a direction shown by the double headed arrow 72 (FIG. 2) to maintain the proper focus.

The detectors 85, 120 and 150 may all be the same type of detector which, for example, may be a four sector detector such as produced by the Silicone Detector Corporation with a part No. SD 055-23-21-011 or like that described in the above-mentioned book "Optical Recording A Technical Overview" pages 165–172. Considering detector 150, when properly focused, the signal on the four sectors will be a circle and each sector will receive the same energy, but in an out-of-focus condition the circle changes to an ellipse and eventually becomes a line oriented in a first or opposite direction depending on the direction lens 64 is away from the proper focus position. Thus the sectors will receive unequal amounts of radiation and by determining which ones are larger, detector 150 can determine the amount and direction of the out-of-focus condition. The electronics in box 154 would operate to sum the outputs from opposite quadrants and then difference these sums to determine which quadrants were greater or determine that they were equal.

Detector 120 operates in a similar way but only needs two quadrants. The two beams from the Wollaston prism would be focussed, one each on the quadrants and the output on line 122 would be two signals which the utilization device would compare to read a "1" or a "0" indicative of the orientation of the return radiation and thus the code on the magnetic recording.

Detector 185, on the other hand, may use all four sectors to measure the total amount of energy received for purposes of controlling the energy level of the source 120. The electronics 88 would sum the four signals and compare this to a reference value.

It should be noted that the system comprises a single rhomboid prism having a single PBS coated surface and so arranged that the rays of energy from the source to the recording medium pass through this single coating twice to reflect a maximum amount of the "S" polarization component out of the system and after reflection from the recording medium the energy is again reflected from the PBS coating to pass a minority of the "P" polarization component and substantially all of the "S" polarization component introduced by the data on the recording medium to the data detectors. It should also be noticed that by cementing the components together, a single unitary or monolithic structure is formed and the number of separate optical parts is reduced to a minimum.

The systems of FIGS. 1 and 2 operate with light when it is desired to have collimated radiation in the system. If such requirement is not necessary, then a system such as shown in FIG. 3 may be employed and even further reduce complexity and the number of components used.

In FIG. 3, the elements having the same function as in FIGS. 1 and 2 have the same reference numeral. It should be noted that the only basic difference between FIGS. 1, 2 and 3 is that the light from the source 30 no longer passes through a collimating lens, but is rather divergent as it strikes the right angle prism 40 and passes through the upper portion of surface 21 of rhomboid prism 20. As before, nearly all of the "S" polarization component is reflected out of the system and the 80% of the "P" polarization component continues into the rhomboid prism 20 and is totally internally reflected from the second surface 46. After reflection, the radiation continues to diverge as the strikes the lower portion of surface 21 where a minority is reflected to lens 75 to be focussed on detector 85 to provide power control, as before. The majority of the energy which passes through the lower portion of the surface 21 is collimated by lens 158 and is focussed on to the magnetic material 94 by the objective lens 64. In FIG. 3, the mirror 60 which operated to fold the energy in FIGS. 1 and 2 has been omitted since this folding mirror is not required in all cases. In any event, energy reflected from the magnetic material 94 again strikes the lower portion of surface 21 and a minority portion is again reflected to the detector 120 through right angle prism 50 and Wollaston prism 105. The majority of the reflected energy from the magnetic material 94 passes through the PBS coating is again totally internally reflected from the upper surface 46 and then converges towards the left where it is reflected by the PBS coating 23 upwardly to be finally totally internally reflected off the upper surface 46 to the left and through the focusing lens 140 and cylindrical lens 142 to the detector 150. The external circuitry has not been shown in FIG. 3, but in all respect acts the same as it did in respect to FIGS. 1 and 2 and need not be further described herein.

It is therefore seen that I have provided a simple compact and ruggedized optical recording head for use with a magneto optical recording system that has separate data signal, focus signal and power monitor paths and that the recording head minimizes the number of optical components and utilizes but a single PBS coating along one surface of the rhomboid prism.

Although the present invention has been described with reference to the preferred embodiments, workers skilled in the art will recognize that changes may be made in form and detail without departing from the spirit and scope of the invention.

What is claimed is:

1. Optical apparatus for use in reading and writing data onto a recording medium comprising:

prism means having first, second, third and fourth surfaces, the first surface having polarizing beam splitting material thereon which material is highly reflective to radiation polarized in a first sense while transmissive to a majority of radiation polarized in a second sense, the second surface being highly reflective to radiation, the third and fourth surfaces being radiation transmissive;

first means for transmitting a beam of polarized radiation as an input and arranged so that a majority of the input passes to a first portion of the first surface and through the beam splitting material into the prism as radiation polarized in the second sense and thence to the second surface where it is reflected back to a second portion of the first surface where it is split into first and second beams, the first beam containing the majority of the radiation is transmitted out of the prism as a first output and the second beam containing a minority of the radiation is reflected to the third surface where it is transmitted out of the prism to power monitoring means;

second means for transmitting the first output beam to the recording medium for use in recording data thereon and for receiving radiation reflected therefrom containing information recorded on the medium, the second means transmitting the reflected radiation to the first surface where it is split into third and fourth beams, the third beam containing a minority of the radiation being reflected from the first surface toward data signal receiving means and the fourth beam containing the majority of the radiation being transmitted through the beam splitting material and through the prism to the second surface for reflection to the fourth surface where it is transmitted out of the prism toward focus detecting means.

2. Apparatus according to claim 1 wherein the prism means is a rhomboid prism.

3. Apparatus according to claim 1 wherein the first and second means include first and second right angle prisms cemented to first and second portions of the first surface.

4. Apparatus according to claim 3 wherein the input enters the first right angle prism substantially perpendicular to one surface thereof and leaves the first right angle prism at the cemented surface so as to pass through the beam splitting material at a substantially forty-five degree angle and the third beam passes through the beam splitting material at substantially forty-five degrees and enters the second right angle prism at the cemented surface and leaves the second right angle prism substantially perpendicular to another surface thereof.

5. Apparatus according to claim 4 wherein the first and second means further include lens means to focus the radiation coming from the prism and passing therethrough.

6. Apparatus according to claim 5 further including motive means to move the second lens means to provide proper focus for the radiation to the recording medium.

7. Apparatus according to claim 6 wherein the motive means is controlled by the focus condition sensed by the focus detecting means.

8. Apparatus according to claim 5 wherein the first lens means operates to collimate the radiation passing therethrough.

9. Apparatus according to claim 1 wherein the polarization of the first sense is "S" polarization and the polarization of the second sense is "P" polarization.

10. Apparatus according to claim 1 further including third lens means arranged to receive and focus radiation from the fourth surface.

11. Apparatus according to claim 1 further including intensity control means to control the intensity of the input radiation.

12. Apparatus according to claim 11 wherein the intensity control means is controlled by the power monitor means so as to maintain the intensity of radiation to the recording means at a relatively constant level.

13. Apparatus according to claim 1 wherein the second surface is totally internally reflecting.

14. Recording apparatus comprising:

beam producing means for producing a polarized beam;

beam splitter means on a surface of a material, a first portion of the beam splitter receiving the polarized beam and transmitting a part thereof through the material to a first reflecting surface so that the transmitted part is reflected to a second portion of the beam splitter means to produce first and second beams, the first being reflected to a power monitor and the second being transmitted to a recording medium for reflection back to the beam splitter means to produce third and fourth beams, the third being reflected to a data detector and the fourth being reflected to a focus monitor.

15. Recording apparatus comprising:

means producing a polarized beam having first and second polarization components;

magnetic recording means;

power monitoring means;

data detecting means;

focus detecting means;

beam splitting means on one surface of a prism; and beam directing means operable to direct the beam through a first portion of the beam splitting means to remove most of the first polarization component and to transmit the second polarization component into the prism where, a first portion of the second polarization component is directed over a first path through a second portion of the beam splitting means to the magnetic recording means, and a second portion of the second polarization component is reflected from the beam splitting means over a second path to the power monitoring means, said beam directing means also operable to receive reflections back over the first path from the magnetic recording means to the beam splitting means, which reflections contain the second polarization component and also some first polarization component introduced by data on the magnetic recording means, and to direct a first portion of the reflections reflected from the beam splitting means to the data detector and direct a second portion of the reflections through the beam splitting means to the focus detecting means.

* * * * *

UNITED STATES PATENT AND TRADEMARK OFFICE
CERTIFICATE OF CORRECTION

PATENT NO. : 5,200,946
DATED : April 6, 1993
INVENTOR(S) : BERNARD S. FRITZ It is certified that error appears in the above-identified patent and that said Letters Patent is hereby corrected as shown below:

On the Title Page,
   delete [54] SIMPLE MAGNETO-OPTIC REWRITABLE HEAD
         FOR ROUGHEDIZED ENVIRONMENTS insert [54] SIMPLE MAGNETO-OPTIC REWRITABLE HEAD
         FOR RUGGEDIZED ENVIRONMENTS On the Title Page,
   delete [75] Inventor: Bernard S. Fritz, Egan, Minn.

insert [75] Inventor: Bernard S. Fritz, Eagan, Minn.

On the Title Page, in the [56] References Cited Section, under OTHER PUBLICATIONS, insert --

Optical Recording, "A Technical Overview", Alan B. Marchant, pages 68-74; 165-72; 180-181 and 209-219

Signed and Sealed this

Nineteenth Day of April, 1994

*Attest:*

BRUCE LEHMAN

*Attesting Officer*     *Commissioner of Patents and Trademarks*